(12) United States Patent
Sauter

(10) Patent No.: US 6,802,384 B2
(45) Date of Patent: Oct. 12, 2004

(54) POWERSTART LOGIC FOR A TRACTION CONTROL SYSTEM

(75) Inventor: Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/401,162

(22) Filed: Mar. 27, 2003

(65) Prior Publication Data
US 2003/0213629 A1 Nov. 20, 2003

(30) Foreign Application Priority Data

Mar. 27, 2002 (DE) .......................................... 102 13 664
Aug. 21, 2002 (DE) .......................................... 102 38 218

(51) Int. Cl.⁷ .............................................. B60T 8/00
(52) U.S. Cl. ...................................... 180/197; 701/84
(58) Field of Search ................................ 180/197, 233, 180/242, 252; 701/82, 84, 70

(56) References Cited

U.S. PATENT DOCUMENTS

| | | | | |
|---|---|---|---|---|
| 5,724,942 A | * | 3/1998 | Maute et al. | 123/352 |
| 6,186,116 B1 | * | 2/2001 | Armstrong et al. | 123/350 |
| 6,615,126 B1 | * | 9/2003 | Potter et al. | 701/84 |
| 6,618,662 B2 | * | 9/2003 | Schmitt et al. | 701/82 |
| 6,636,795 B1 | * | 10/2003 | Morscheck | 701/84 |
| 6,644,428 B2 | * | 11/2003 | Gady et al. | 180/197 |

* cited by examiner

Primary Examiner—Lesley D. Morris
Assistant Examiner—Matthew Luby
(74) Attorney, Agent, or Firm—Kenyon & Kenyon

(57) ABSTRACT

A device and a method for traction control for a vehicle, the setpoint engine torque being reduced to a pre-control value if one drive wheel exceeds a specified slip threshold, the rate time being increased if the vehicle acceleration or speed exceeds a threshold value, the setpoint engine torque being increased during the rate time as a function of the vehicle acceleration or speed, and regulation of the slipping wheel being initiated after the end of the rate time.

5 Claims, 3 Drawing Sheets

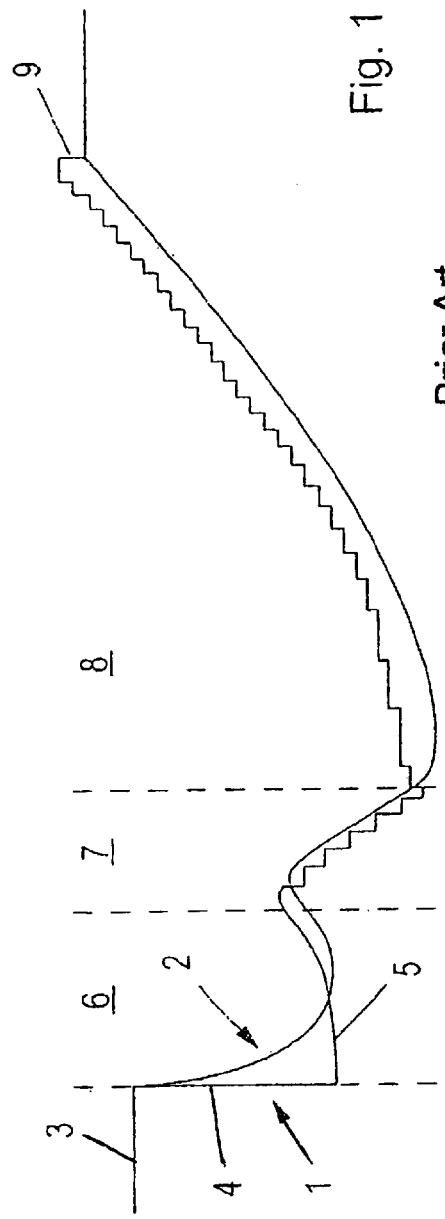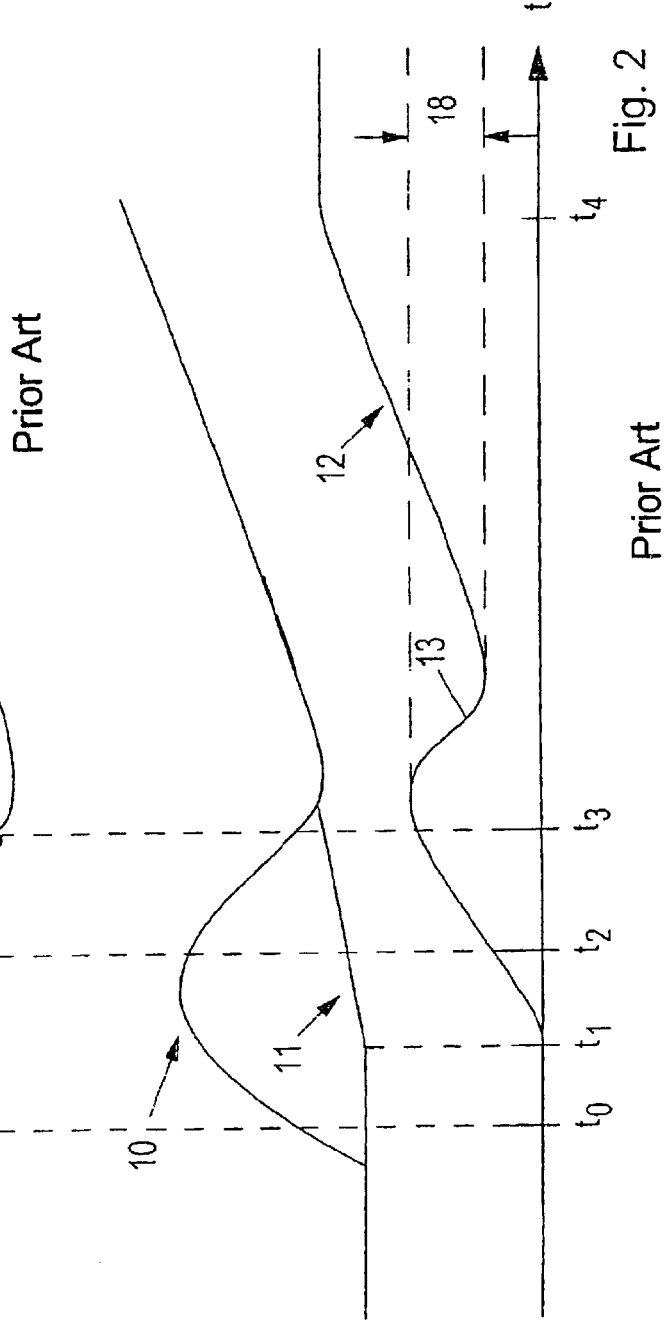

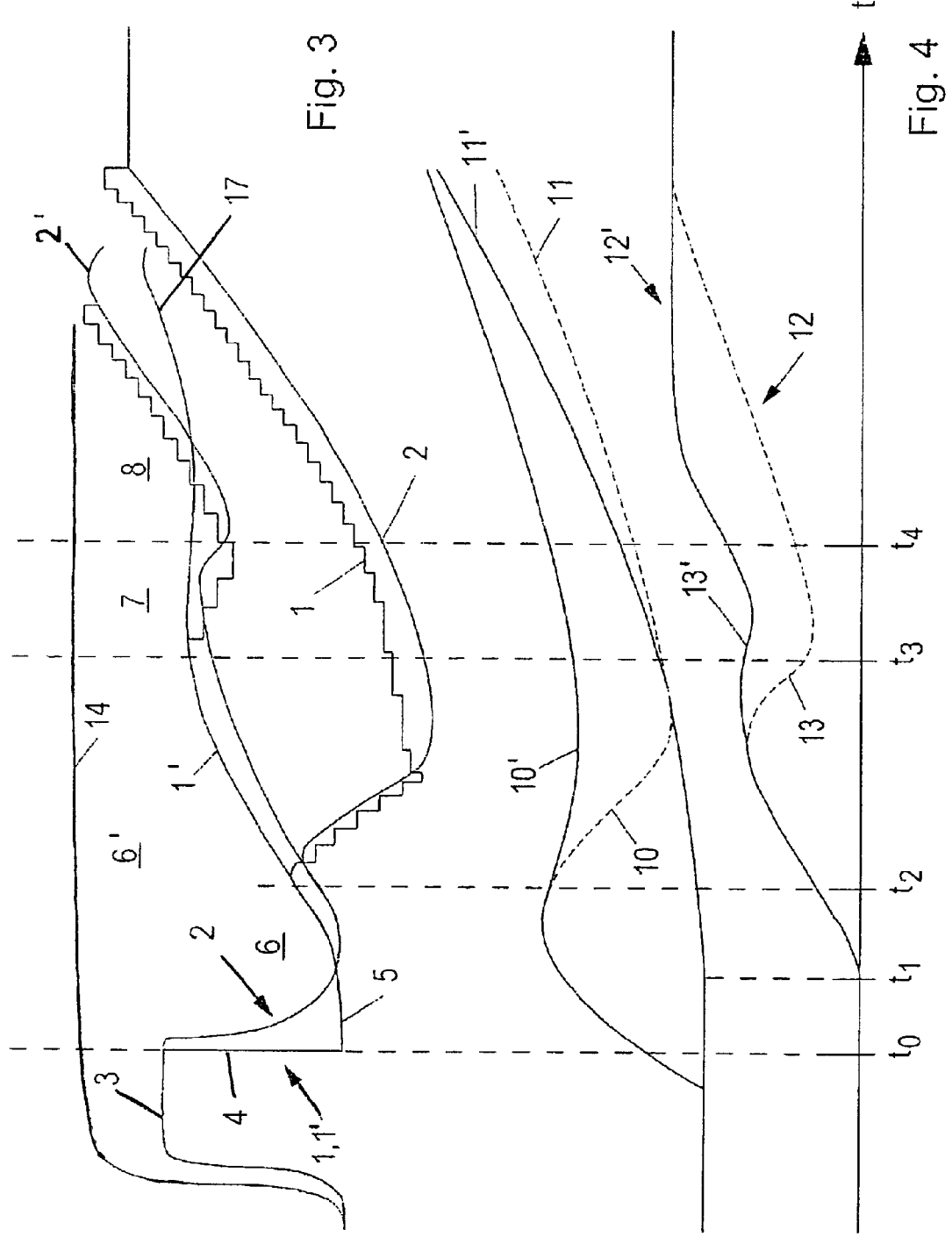

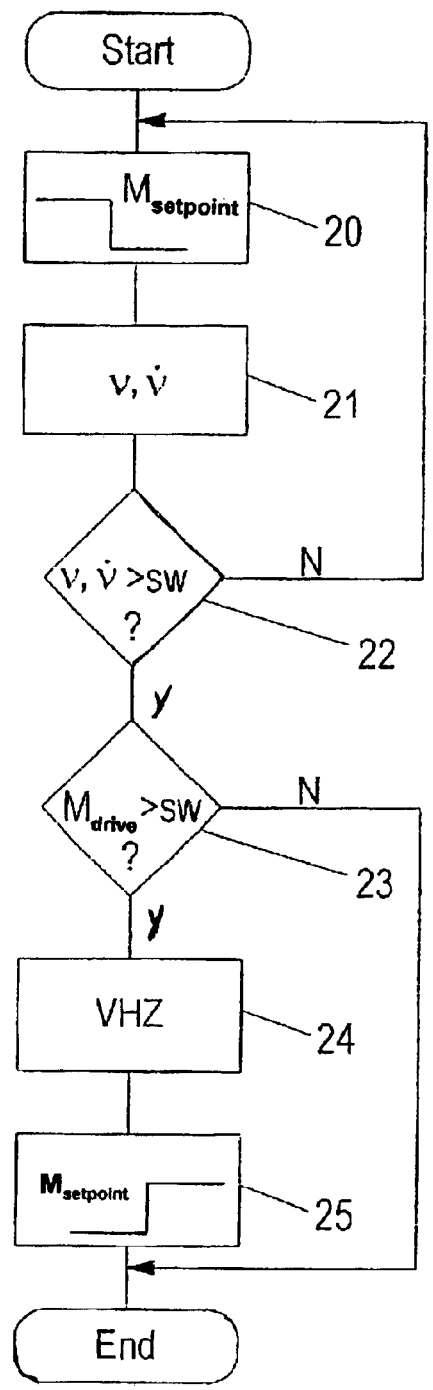
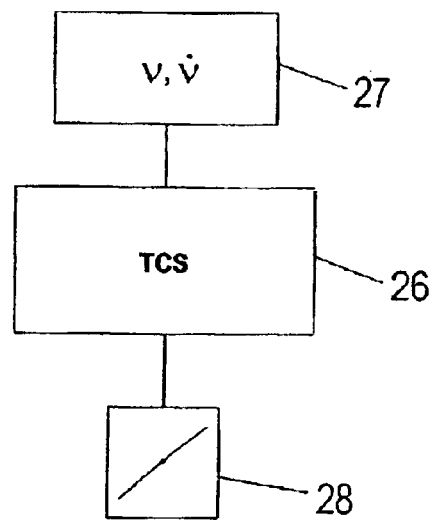
Fig. 5
Fig. 6

POWERSTART LOGIC FOR A TRACTION CONTROL SYSTEM

FIELD OF THE INVENTION

The present invention relates to a method for traction control and a traction control system.

BACKGROUND INFORMATION

When starting off or accelerating a vehicle on a slippery road surface, a traction control system (TCS) automatically intervenes in the operation of the vehicle if at least one drive wheel begins to slip and exceeds a specified slip threshold. To this end, the engine torque is as a rule reduced by adjusting the throttle valve. If necessary, the slipping drive wheels may also be decelerated by a braking intervention. After having dropped below the specified slip threshold, the engine torque is then increased again.

FIG. 1 shows the curve of an engine torque 1 during a TCS regulation. The setpoint engine torque specified by the regulation is denoted by reference notation 1, the actual torque by reference notation 2.

If speed 10 (see FIG. 2) exceeds a specified slip threshold at point in time t0, the TCS abruptly reduces engine torque 1 to a pre-control value 5. The degree of setback 4 is ordinarily a function of the sum of the running resistances.

Setpoint engine torque 1 or pre-control value 5 is subsequently increased during a rate time 6 as a function of vehicle acceleration 12 (see FIG. 2). As can be seen, the vehicle starts to move off and accelerate from point in time t1. Pre-control value 5 also increases correspondingly.

During rate time 6, the TCS control loop is still not closed, so that control of setpoint engine torque 1 actually occurs in this phase.

A high wheel slip occurs not only when starting off on a slippery road surface but also when starting off on a non-skid road surface if the driver engages the clutch hard while applying high torque. Since the vehicle attains only a fraction of the ultimate acceleration during rate time 6 and it is only possible to make an extremely rough estimate of the adhesive friction value of the road surface, in this case a very low pre-control value 5 is selected—as if the vehicle were on a slippery road surface—although the road surface actually has a very high coefficient of friction.

The consequence of this TCS regulation is the curve of vehicle acceleration 12 shown in FIG. 2 with an acceleration drop 13. The degree of acceleration drop 13 (see reference notation 18) may assume values exceeding 1 m/s². The driver, who would actually like to accelerate rapidly, perceives a drop in acceleration by more than 1 m/s² as very unsatisfactory.

After rate time 6, the setpoint engine torque is reduced still further since the slipping drive wheel is again being regulated. Only at point in time t3 does speed 10 of the driven wheel again drop back below the specified slip threshold, as a result of which setpoint engine torque 1 is subsequently increased again (see control phase 8).

SUMMARY OF THE INVENTION

According to an embodiment of the present invention vehicle acceleration is improved by prolonging the rate time of a traction control system in a starting-off operation, if the vehicle acceleration or speed exceeds a specified threshold value, and by increasing the setpoint engine torque during the prolonged rate time as a function of the vehicle acceleration or speed. If the vehicle attains high acceleration values or speeds within the original rate time (usually 180 ms), this is an indication of a non-skid road surface having a high coefficient of friction. The prolongation of the rate time may cause the vehicle to be accelerated further before the start of the actual TCS regulation, which reduces the engine torque. In one embodiment the rate time is prolonged to at least 250 ms. In another embodiment, the rate time is prolonged to at least 300 ms or more.

The prolongation of the rate time preferably occurs only if the engine torque or drive torque exceeds a specified threshold value. The prolongation of the rate time also preferably occurs only when the vehicle is started off or at low speeds, e.g., less than 10 km/h.

Usually, an attenuation factor is taken into consideration when calculating the pre-control value or the setpoint engine torque. According to one embodiment of the present invention, this attenuation factor is changed as a function of the vehicle acceleration; in particular, it is increased with increasing vehicle acceleration. The attenuation factor may also assume values greater than one.

BRIEF DESCRIPTION OF THE DRAWINGS

FIG. 1 shows an engine torque curve during a TCS regulation according to the related art;

FIG. 2 shows the associated curve of vehicle speed and acceleration;

FIG. 3 shows an engine torque curve after prolongation of the rate time according to one exemplary embodiment of the present invention;

FIG. 4 shows the associated curve of vehicle speed and acceleration;

FIG. 5 shows a flow chart to explain the traction control regulation according to one embodiment of the present invention; and FIG. 6 shows a TCS, which is set up to implement the method of FIG. 5.

DETAILED DESCRIPTION

FIG. 3 shows the curve of a setpoint engine torque 1' and associated actual torque 2' during a TCS regulation with a prolonged rate time 6'. For comparison, engine torque curves 1, 2 of a TCS of the related art (corresponding to FIG. 1) are also plotted.

The engine torque curve and speed curve of FIGS. 3 and 4 are based on a driving situation in which the driver intends to start off fast and accelerate by engaging the clutch hard and applying a high drive torque on a road surface having a moderate or high coefficient of friction. The TCS functions as follows: due to the high specified torque 14, the drive wheels start to slip despite a relatively non-skid road surface. Speed 10' of the driven wheels increases abruptly (see FIG. 4) and exceeds a specified slip threshold at point in time t0.

The TCS immediately reduces setpoint engine torque 1' from a passive value 3 to a pre-control value 5. The degree of setback 4 is essentially oriented to the sum of running resistances MAR. The following applies:

$$MAR = MWR + MWB \cdot F + MWL + MWK,$$

where

MAR Setback torque at start of regulation

MWR Rolling resistance torque

MWB Acceleration resistance torque

F Attenuation factor
MWK Curved track rolling resistance torque
MWL Air resistance torque With the lack of specific information concerning the actual coefficient of friction of the road surface, initial pre-control value 5 is set relatively low for safety reasons, e.g., to a specified pre-control value 5 for starting off at a low coefficient of friction. This is often lower than would actually be necessary for the actual road surface conditions.

During rate time 6, pre-control value 5 is later corrected, setpoint engine torque 1' being increased as a function of determined vehicle acceleration 12' (see FIG. 4). As can be seen, the vehicle starts off at point in time t1 and subsequently accelerates increasingly. Within regular rate time 6 (approximately 180 ms), actual vehicle acceleration 13' is constantly compared with a threshold value. If vehicle acceleration 12' is greater than the threshold value, it is possible to assume a high coefficient of friction. The same also applies with reference to vehicle speed 11, 11'. Rate time 6 is then prolonged automatically and a new rate time 6' is selected. New rate time 6' is, for example, 400 ms.

During this new rate time 6', setpoint engine torque 1' is increased further as a function of vehicle acceleration 12' or the vehicle speed. As a result, the drive wheels continue to slip longer (see wheel speeds 10, 10'); however, the vehicle accelerates considerably faster.

As can be seen in FIG. 4, hardly any acceleration drop 13' occurs any more compared to vehicle acceleration 12 with a short rate time 6.

After the end of rate time 6', the TCS control loop is closed and setpoint engine torque 1' is reduced during a short first control phase 7. After the drive wheels have again fallen below the specified slip threshold at point in time t4, engine torque 1' is increased again using an addition routine (control phase 8).

The described TCS regulation preferably applies only during starting off operations and speeds less than, e.g., 10 km/h. Preferably, it also applies only when driving straight ahead in order not to unintentionally lose lateral stability in curves.

The length of rate time 6' is a function of vehicle acceleration 12' or speed 11' determined within regular rate time 6. The rate time is preferably longer when the determined vehicle acceleration 12' or speed 11' is higher.

As mentioned, setpoint engine torque 1' or pre-control value 5 is calculated on the basis of an engine torque balance. Acceleration resistance torque MWB of the vehicle (=vehicle mass*vehicle acceleration*wheel radius) is multiplied by an attenuation factor F, which is a function of the driving situation. The range of values of attenuation factor F is ordinarily between 0.5 and 0.8.

If vehicle acceleration 12' or speed 11' exceeds a specified threshold value, the attenuation factor is increased. Attenuation factor F may also assume values greater than one.

With attenuation factors F less than, e.g., 0.8, an actual torque 17 is set; with attenuation factors F higher than 0.8, a correspondingly higher actual engine torque 2' is set.

FIG. 5 shows an exemplary embodiment of the method of the present invention in the form of a flow chart. In step 20, setpoint engine torque 1, 1' is abruptly reduced to a pre-control value 5 if one drive wheel exceeds a specified slip threshold. After that, in step 21, vehicle acceleration 12' or speed 11' is determined during rate time 6. In step 22, it is determined if vehicle acceleration 12' or speed 11' exceeds a specified threshold value sw. Furthermore, in step 23, it is checked whether the drive torque is greater than a specified threshold value sw. If both comparisons in step 22 and in step 23 are positive, rate time 6 is prolonged to a rate time 6' in step 24 and setpoint engine torque 1' is increased during the prolonged rate time 6'.

FIG. 6 shows an associated TCS, which is set up to implement the described method. The TCS includes a central control and regulating unit 26 as well as unit 27 to detect vehicle acceleration 12, 12' or speed 11, 11'. Central control and regulating unit 26 is also connected to a throttle valve 28, which is correspondingly regulated to set a specified engine torque 1, 1'.

What is claimed is:

1. A method for traction control for starting off a vehicle, comprising:

reducing a setpoint engine torque abruptly to a pre-control value if a drive wheel exceeds a specified slip threshold, the drive wheel exceeding the specified slip threshold corresponding to a slipping wheel;

initiating a regulation of the slipping wheel after an end of a rate time;

determining one of a vehicle acceleration and a vehicle speed during the rate time;

setting a prolonged rate time if one of the vehicle acceleration and the vehicle speed exceeds a specified threshold value; and increasing the setpoint engine torque during the prolonged rate time as a function of one of the vehicle acceleration and the vehicle speed.

2. The method as recited in claim 1, wherein:

the prolonged rate time is one of at least 250 ms and at least 300 ms.

3. The method as recited in claim 1, wherein:

the setting of the prolonged rate time and a change of the setpoint engine torque are only performed if a drive torque exceeds another specified threshold value.

4. The method as recited in claim 1, further comprising:

calculating the setpoint engine torque; and setting an attenuation factor as a function of one the vehicle acceleration and the vehicle speed, the attenuation factor being taken into consideration in calculating the setpoint engine torque.

5. A traction control system, comprising:

an arrangement for detecting one of a vehicle acceleration and a vehicle speed;

an arrangement for reducing abruptly a setpoint engine torque to a pre-control value if a drive wheel exceeds a specified slip threshold, the drive wheel exceeding the specified slip threshold corresponding to a slipping wheel;

an arrangement for initiating a regulation of the slipping wheel after an end of a rate time;

an arrangement for determining one of the vehicle acceleration and the vehicle speed during the rate time;

an arrangement for setting a prolonged rate time if one of the vehicle acceleration and the vehicle speed exceeds a specified threshold value; and an arrangement for increasing the setpoint engine torque during the prolonged rate time as a function of the vehicle acceleration.

* * * * *